Figure 1:
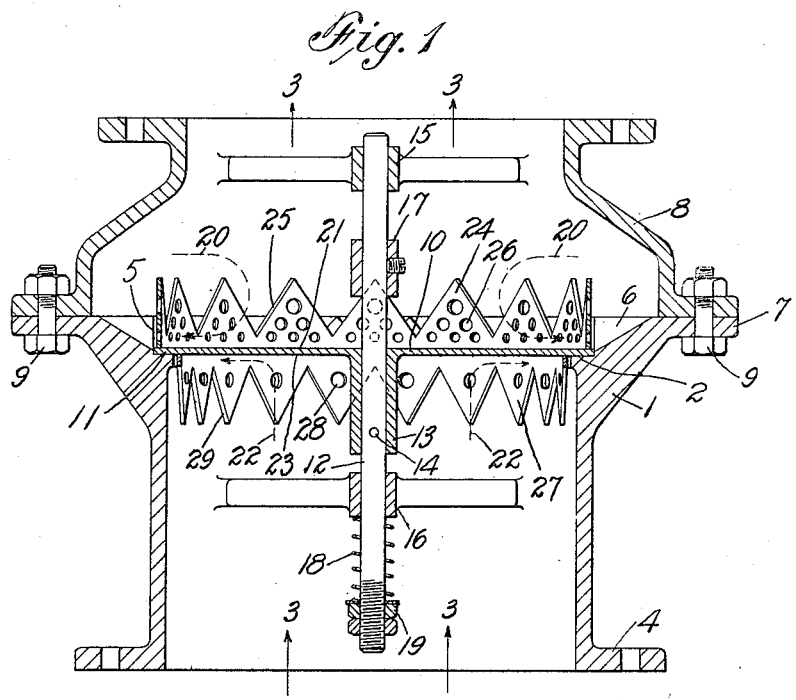

S. A. REEVE.
NON-PULSATING AUTOMATIC FLUID VALVE.
APPLICATION FILED JUNE 8, 1910.

1,013,093.

Patented Dec. 26, 1911.

Witnesses
Frank N. Vict Jr.
W. F. Allen

Inventor
Sidney A. Reeve
by Renard Day
atty.

COLUMBIA PLANOGRAPH CO., WASHINGTON, D. C.

UNITED STATES PATENT OFFICE.

SIDNEY A. REEVE, OF NEW YORK, N. Y., ASSIGNOR TO ROTARY METER COMPANY, A CORPORATION OF NEW YORK.

NON-PULSATING AUTOMATIC FLUID-VALVE.

1,013,093.     Specification of Letters Patent.     Patented Dec. 26, 1911.

Application filed June 8, 1910. Serial No. 565,797.

*To all whom it may concern:*

Be it known that I, SIDNEY A. REEVE, a citizen of the United States, and a resident of the city of New York, county of Richmond, and State of New York, have invented certain new and useful Improvements in Non-Pulsating Automatic Fluid-Valves, as set forth in the following specification.

This invention relates broadly to valves and other structures operated by fluid-pressure and fluid-flow.

Broadly the object of the invention is to render the member operated by the fluid-pressure and fluid-flow non-pulsating or non-fluttering. For the purposes of description this member is termed the valve-plate.

The invention is particularly applicable to the construction of automatic check valves for use with gaseous fluids including air, steam, vapor, illuminating gas and fuel gas, as well as many others of a similar character.

Particularly in the construction of check valves for gaseous fluids the movable valve-member or valve-plate has necessarily been as light as possible and of considerably greater area transversely to the flow of the fluid than longitudinally of the flow of fluid. In connection with this type of valve it is well known that an objectionable fluttering or pulsating of the valve-plate back and forth in the general direction of the flow of the fluid has been experienced. This is believed to have been caused by the creation of a partial vacuum first about the outer face of the valve-plate and then about the inner face of the valve-plate caused by the radial flow of fluid across the margin or rim of the valve-plate.

For the furtherance of the general objects of this invention means is provided for checking the radial flow of fluid across a face of the valve-plate. In case the valve-plate is circular it is well understood what is meant by radial flow, namely, a flow from the central part of the plate outward across the margin or vice versa. Inasmuch as it is far from necessary that the valve-plate be circular it is to be understood that the expression radial flow is descriptive likewise of a similar flow across a face of a valve-plate of any configuration, which flow is from the central part outward or vice versa.

In the specific embodiment of the invention illustrated, there has been combined with a valve-plate and valve-seat, both positioned transversely to the general flow of fluid, a plurality of barriers adjacent to the valve-seat for checking the radial flow of fluid.

It is a further object of the invention to provide for the gradual decrease in the checking effect upon the radial flow of fluid of these barriers as the valve opens. In connection with this object recourse has been had to the well known law for the flow of fluids, namely, that a given area of fluid opening presents much greater resistance to flow when divided into a large number of openings than when divided into a fewer number of openings.

The above and further objects of the invention are specifically set forth in the accompanying claims and will be clear from the illustrative embodiment of the invention set forth in the following specification which should be read in connection with the accompanying drawings, which form a part of this application and in which,—

Figure 2:
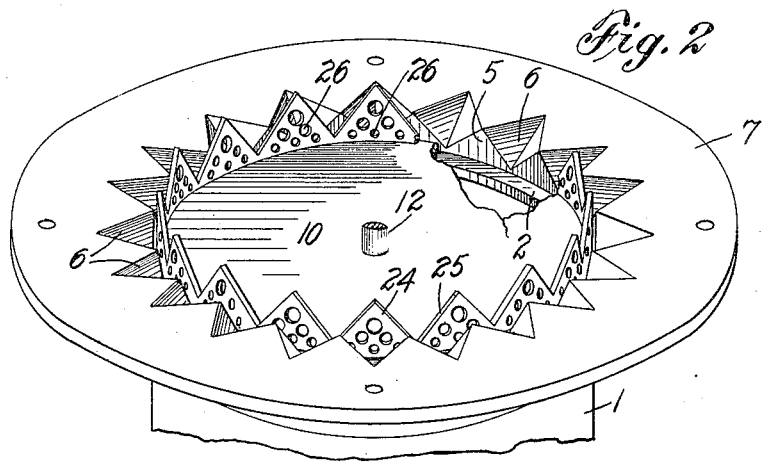
Figure 3:
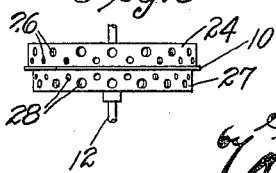

Figure 1 is a central vertical section through an embodiment of the invention; Fig. 2 is a top perspective view with parts broken away showing the valve-plate and valve-seat; and Fig. 3 is a front elevation showing a modification of the valve plate.

Referring now more in detail to the drawings, 1 designates that part of the valve-structure which is fixed. It is provided with the flat annular valve-seat 2 encircling the main fluid duct indicated by the arrows 3. This part 1 may conveniently be a cast iron casing in the form of a drum-like shell provided with the flange 4 for connecting the valve to any desired piece of apparatus, although part 1 may be considered an integral part of such apparatus. The valve-seat 2 is shown formed as a ledge or internal flange in a plane transverse to the duct 3 and is encircled by a perforated barrier 5, the inner face of which extends outwardly at right angles thereto across the edge of the valve-plate 10. The perforations for this barrier are shown in the form of a continuous series of cast or cut tetra-hedral notches 6 arranged to flare outwardly as indicated. The barrier 5 is extended radially outwardly beyond the limits of the notches 6 to form the coupling-flange 7 upon which the flanged outer section 8 of the valve-casing is secured by any suitable means, such as the bolts 9. This outer section 8 provides an annular enlargement in the duct 3 in the locality of the valve-plate 10.

The valve-plate 10 is preferably formed of some light metal such as aluminum and its outer rim 11 seats upon the valve-seat 2, with its periphery just clearing the barrier 5. This valve-plate 10 is shown provided with an axial guiding stem 12 fixed to the plate 10 as by the hub 13 and pin 14. The stem 12 is shown slidably centered in spiders 15 and 16 provided respectively by the sections 8 and 1. The stop-sleeve 17 limits the upward movement of the valve-plate 10 by engagement with the spider 15, while the gravity tends to hold the valve-plate 10 seated upon the valve seat 2 when the valve is vertical, although spring means may be employed to accomplish this purpose. When the valve is vertical as illustrated, a seating spring is not a necessity as is the case when the valve occupies a horizontal or inverted position. A suitable embodiment of satisfactory spring means for seating the valve-plate is indicated by the spring 18 surrounding the stem 12, bearing against the spider 16, and restrained in operative position by the lock nuts 19.

As has been previously explained, it is a purpose of the invention to prevent the radial flow of fluid across the face of the valve-plate 10 as, for instance, in the direction of the dotted arrows 20 from the central portion out across the rim of the valve plate 10 on its outer face 21 or in the direction of the dotted arrows 22 radially across the inner face 23 of the valve-plate 10. To check such a radial flow the valve-plate 10 is provided with a circular outstanding band 24, preferably of light sheet metal, attached to or formed on the outer face 21 of the valve-plate at its rim and in close proximity to the notched barrier-wall 5. This band 24 is provided with a number of fluid-openings, some being formed by the outwardly flaring V-shaped notches 25, and some by the perforations 26, as shown in Figs. 1 and 2, while only perforations 26 are illustrated in the construction of Fig. 3. For the same purpose, the inner surface 23 of the valve-plate 10 is likewise provided with an inwardly directed band or barrier 27 concentrically positioned near the rim of the valve-plate and passing inwardly past the valve-seat 2. This barrier 27 is likewise provided with fluid openings, shown in Fig. 1 as perforations 28 and inwardly flaring V-shaped notches 29 and in Fig. 3 merely as a plurality of series of perforations 28 of graduated size.

Operation: When the parts are as shown and when a fluid pressure is exerted against the inner side 23 of the valve-plate 10, the valve-plate is moved in the direction of the arrows 3 against the forces tending to seat it on the valve-seat 2 and a current of fluid flows into the space within the casing 8 above the valve-plate and forming a continuation of the main fluid-duct all as indicated by the arrows 3. In the case of ordinary fluid-valves not provided with means for checking the flow of radial currents of fluid, the opening of the valve-plate is frequently accompanied by a fluttering, pulsation or dancing of the valve-plate backward and forward in the general direction of the main fluid-duct. When the valve is passing only a slight current these pulsations may cause a hammering or clattering against the valve-seat. Even when the consequent noise is not produced, the action is undesirable because of setting up a pulsating flow in the current of fluid beyond the valve. This pulsation is due to a state of unstable fluid equilibrium, which itself is due to currents of fluid passing radially out from beneath the edge of a valve-plate such as 10, which induce similar radially and outwardly flowing currents along the outer face, such as 21 of a valve-plate, such as 10. These radially flowing currents develop a partial vacuum on the outer surface of the valve-plate and the consequence is the rise of the valve-plate higher than is necessary to permit the prevailing flow of fluid through the valve. This, again, reverses the equilibrium between valve-plate and fluid, so that the valve-plate is then forced down because of a surplus pressure upon its outer surface into a position nearer the valve-seat than normal for the prevailing flow. This, again, accentuates the velocity of radial flow out from the inner surface of the valve-plate and reproduces the condition first described. Such a valve thus alternates between a position farther out and a position farther in than the normal mean corresponding to the prevailing flow. This instability of equilibrium is broken up and rendered stable by the present invention, according to which means is provided for checking the radial flow of fluid as described. Such means is illustrated in the present embodiment by the bands 24 and 27 and the barrier 5 each of which alone and in combination is operative in checking the objectionable radial flow referred to.

It is to be understood that various types of fluid-openings through the three barriers 24, 27 and 5 have been shown although any specific type is immaterial and practically interchangeable. However it is preferable that the openings through each of the three barriers 24, 27 and 5 be arranged in an equivalent manner to that indicated so that radial flow of fluid will be thoroughly impeded when the valve plate is but slightly moved away from its valve-seat, while the impeding effect of the barriers will become gradually less as the valve-plate is separated farther from its seat to accommodate a gradually freed flow of fluid through the valve construction. Thus no vacuum can be produced upon the outer surface of the valve plate 10 and it consequently finds its normal position corresponding to the prevailing flow and remains in stable equilibrium to maintain the prevailing flow of fluid and is free from fluttering or pulsating. In fact it has been found that a valve of this construction is useful in equalizing or steadying the flow of a fluid which flow has become pulsating through causes antecedant to the valve.

As has been previously pointed out the invention is not limited to an embodiment in which the valve-plate or seat are circular, as shown in the drawings, nor is it limited to any particular material for the construction of the various parts, any suitable material being contemplated, as well as the adaptation of the invention to other structures than a pipe line.

What is claimed and what is desired to be secured by United States Letters Patent is:—

1. A non-pulsating fluid-valve comprising, a casing providing a main duct for the passage of fluid and having an annular enlargement; two valve-parts, one, an annular valve-seat encircling and lying in a plane transverse to said duct at the locality of said annular enlargement, and the other, a thin valve-plate movable entirely within said duct so that said fluid tends to flow radially out across one face of said plate and radially in across the other face of said plate and adapted to seat flat against said valve-seat to control the passage of fluid through said duct; and a perforated annular barrier fixed to one of said valve-parts and extending out across the edge of but out of contact with the other valve-part, all to provide a frictional check upon the radial flow of fluid along the face of said valve-plate and thereby prevent the fluttering of said valve-plate.

2. A non-pulsating fluid-valve comprising, a casing providing a main duct for the passage of fluid and having an annular enlargement; two valve-parts, one, an annular valve-seat encircling and lying in a plane transverse to said duct at the locality of said annular enlargement, and the other, a valve-plate movable entirely within said duct and adapted to seat flat against said valve-seat to control the passage of fluid through said duct; a perforated annular marginal barrier fixed to and extending out from the side of said valve-plate opposite said valve-seat; and a second perforated annular barrier fixed to one of said valve-parts and extending out across the edge of the other valve-part but out of contact therewith, all to provide a frictional check upon the radial flow of fluid along the face of said valve-plate and thereby prevent the fluttering of said valve-plate.

3. A non-pulsating fluid-valve comprising, means providing a main duct for the passage of fluid and having a continuous valve-seat lying in a plane transverse to said duct; a flat valve-plate with its rim overlapping said valve-seat; and means for checking the radial flow of fluid across the rim of said valve-plate comprising, two marginal, perforated flanges projecting from opposite faces of said valve-plate, one extending past and one extending away from said valve-seat.

4. A non-pulsating fluid-valve comprising, means providing a main duct for the passage of fluid and having a continuous valve-seat lying in a plane transverse to said duct; a flat valve-plate with its rim overlapping said valve-seat; and means for checking the radial flow of fluid across the rim of said valve-plate comprising, two marginal, perforated flanges projecting from opposite faces of said valve-plate, one extending past and one extending away from said valve-seat; and a notched vertical wall surrounding said valve-seat.

5. A non-pulsating fluid-valve comprising, means providing a ring-shaped valve-seat surrounded by a circular wall having radially positioned tetra-hedral notches flaring in the general direction of the flow of fluid through the opening provided by said valve-seat; a circular valve-plate with its rim overlapping said valve-seat; and a projecting circular flange formed on the outer face of and at the rim of said valve-plate, said flange being provided with a number of restricted fluid-openings.

6. A non-pulsating fluid-valve comprising, means providing a ring-shaped valve-seat surrounded by a circular wall having radially positioned tetra-hedral notches flaring in the general direction of the flow of fluid through the opening provided by said valve-seat; a circular valve-plate with its rim overlapping said valve-seat; and a projecting circular flange formed on the outer face of and at the rim of said valve-plate, said flange being provided with a number of restricted fluid openings comprising a series of V-shaped notches and a number of symmetrically arranged perforations.

In witness whereof, I have signed my name to this specification, in the presence of two subscribing witnesses.

SIDNEY A. REEVE.

Witnesses:
L. ALTMAN,
W. G. ALLEN.

Copies of this patent may be obtained for five cents each, by addressing the "Commissioner of Patents, Washington, D. C."